United States Patent
Wen et al.

(10) Patent No.: US 11,687,306 B1
(45) Date of Patent: Jun. 27, 2023

(54) DISPLAYING CONTROL METHOD

(71) Applicant: ASUSTEK COMPUTER INC., Taipei (TW)

(72) Inventors: I-Jen Wen, Taipei (TW); Cheng-Lin Li, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/948,697

(22) Filed: Sep. 20, 2022

(30) Foreign Application Priority Data

Dec. 29, 2021 (TW) .................................. 110149394

(51) Int. Cl.
*G06F 3/14* (2006.01)
*G06F 9/451* (2018.01)
*G06F 3/0481* (2022.01)

(52) U.S. Cl.
CPC .............. *G06F 3/14* (2013.01); *G06F 3/0481* (2013.01); *G06F 9/451* (2018.02)

(58) Field of Classification Search
CPC ......... H04N 21/40; G06F 3/14; G06F 3/1454; G09G 3/2096; G09G 2340/04; G09G 2340/0464
See application file for complete search history.

(56) References Cited

U.S. PATENT DOCUMENTS 10,108,331 B2 * 10/2018 Li ......................... G06F 3/0488

FOREIGN PATENT DOCUMENTS

| CN | 102360266 A | 2/2012 |
| CN | 102890595 B | 2/2015 |
| CN | 106066750 A | 11/2016 |
| CN | 110162288 A | 8/2019 |
| CN | 111580713 A | 8/2020 |
| TW | 200519795 A | 6/2005 |
| TW | 201525844 A | 7/2015 |

* cited by examiner

*Primary Examiner* — Priyank J Shah
(74) *Attorney, Agent, or Firm* — Muncy, Geissler, Olds & Lowe, P.C.

(57) ABSTRACT

A displaying control method adapted to an electronic device with a first display and a second display is provided. The displaying control method comprises the following steps. Firstly, a window is displayed on the first display. Then, in response to a first trigger signal, a control interface corresponding to the window is generated on the first display. The control interface comprises a first operating area and a second operating area corresponding to the first display and the second display respectively. Then, in response to a second trigger signal, a plurality of actuating regions is displayed in the first operating area or the second operating area. Thereafter, in response to a selecting signal corresponding to one of the actuating regions, the window is moved within a range of the first display and the second display.

11 Claims, 10 Drawing Sheets

DISPLAYING CONTROL METHOD

CROSS-REFERENCE TO RELATED APPLICATION

This application claims the priority benefit of Taiwan application serial No. 110149394, filed on Dec. 29, 2021. The entirety of the above-mentioned patent application is hereby incorporated by reference herein and made a part of the specification.

BACKGROUND OF THE INVENTION

Field of the Invention

This application relates to the technical field of display control of electronic devices, and in particular, to a displaying control method adapted to a multi-display electronic device.

Description of the Related Art

Conventional operating systems support the function of connecting multiple displays to a single computer. However, in a conventional operating system, after opening a window, to adjust the window position or window size, a user needs to manually drag the window to the desired display and then drag and resize the window to adjust the window position, which causes inconvenience to the user.

BRIEF SUMMARY OF THE INVENTION

This application provides a displaying control method adapted to an electronic device. The electronic device includes a first display and a second display. The displaying control method includes the following steps. Firstly, a window is displayed on the first display. Then, in response to a first trigger signal, a control interface corresponding to the window is generated on the first display. The control interface includes a first operating area and a second operating area corresponding to the first display and the second display respectively. Then, in response to a second trigger signal, a plurality of actuating regions is displayed in the first operating area or the second operating area. Thereafter, in response to a selecting signal corresponding to one of the actuating regions, the window is moved within a range of the first display and the second display.

According to the displaying control method provided in this application, after the window is displayed on the display, a user uses the control interface to quickly move the window between multiple displays and place the window at a specific position, without manually dragging the window. Therefore, it helps improve the work efficiency of the user.

DETAILED DESCRIPTION OF THE EMBODIMENTS

Specific embodiments of this application will be described in more detail below with reference to the schematic diagrams. The advantages and features of this application will become clearer from the following description and the claims. It is to be understood that the drawings are all in a very simplified form and in an inaccurate scale, and are only used to conveniently and clearly explain the objectives of the embodiments of this application.

Figure 1A:
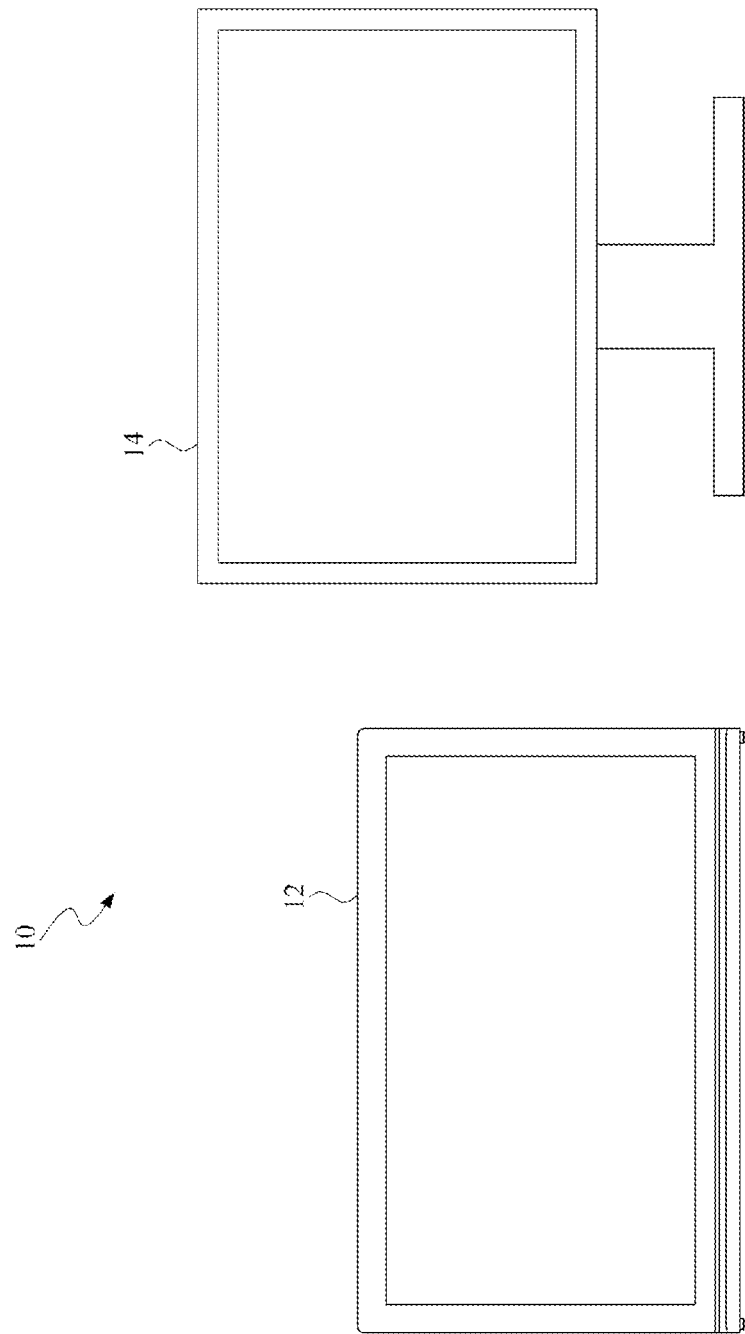
FIG. 1A and FIG. 1B are a schematic three-dimensional diagram and a schematic block diagram of an embodiment of an electronic device of this application.
Figure 1B:
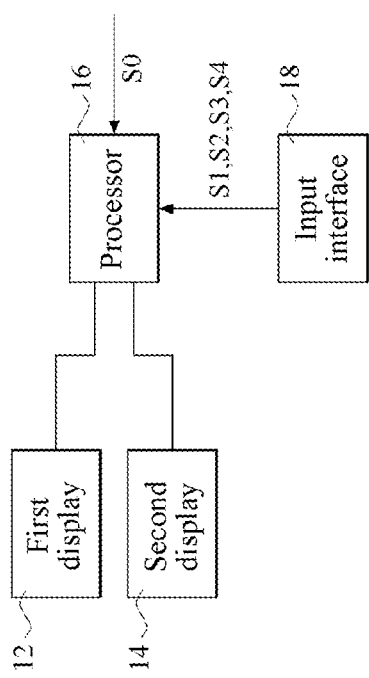

FIG. 1A and FIG. 1B are a schematic three-dimensional diagram and a schematic block diagram of an embodiment of an electronic device of this application. As shown in the figures, an electronic device 10 includes a first display 12, a second display 14, a processor 16, and an input interface 18.

The processor 16 is configured to control the display area of the first display 12 and the second display 14. In an embodiment, the processor 16 is a central processing unit. The input interface 18 is configured to receive a control signal inputted externally. In an embodiment, the input interface 18 is a keyboard, a mouse, or a track pad.

In an embodiment, an electronic device 10 is a laptop computer connected to an external display. A displaying control method in this application is also applicable to other electronic devices, such as a computer connected with multiple displays, a laptop computer with multiple displays, and the like.

Figure 2:
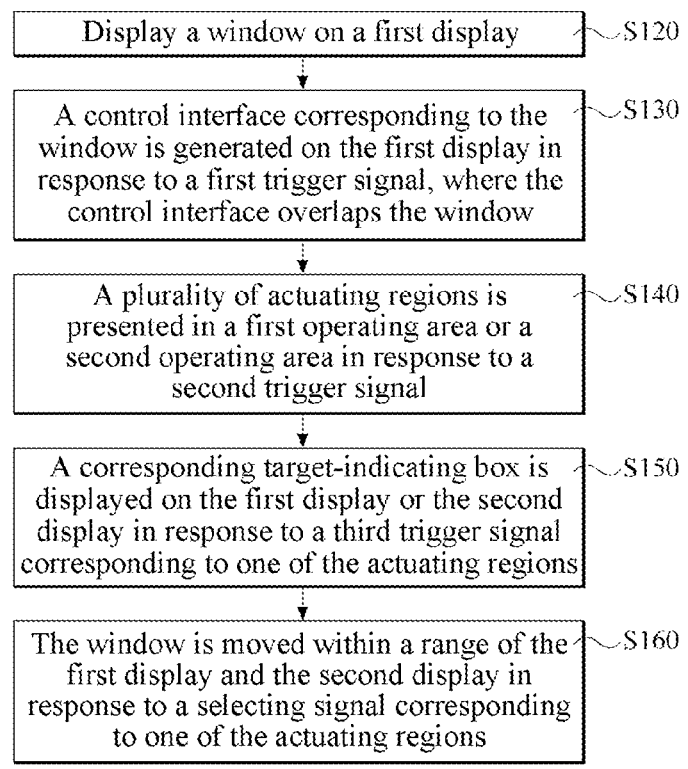
FIG. 2 is a flowchart showing an embodiment of a displaying control method of this application.
Figure 3:
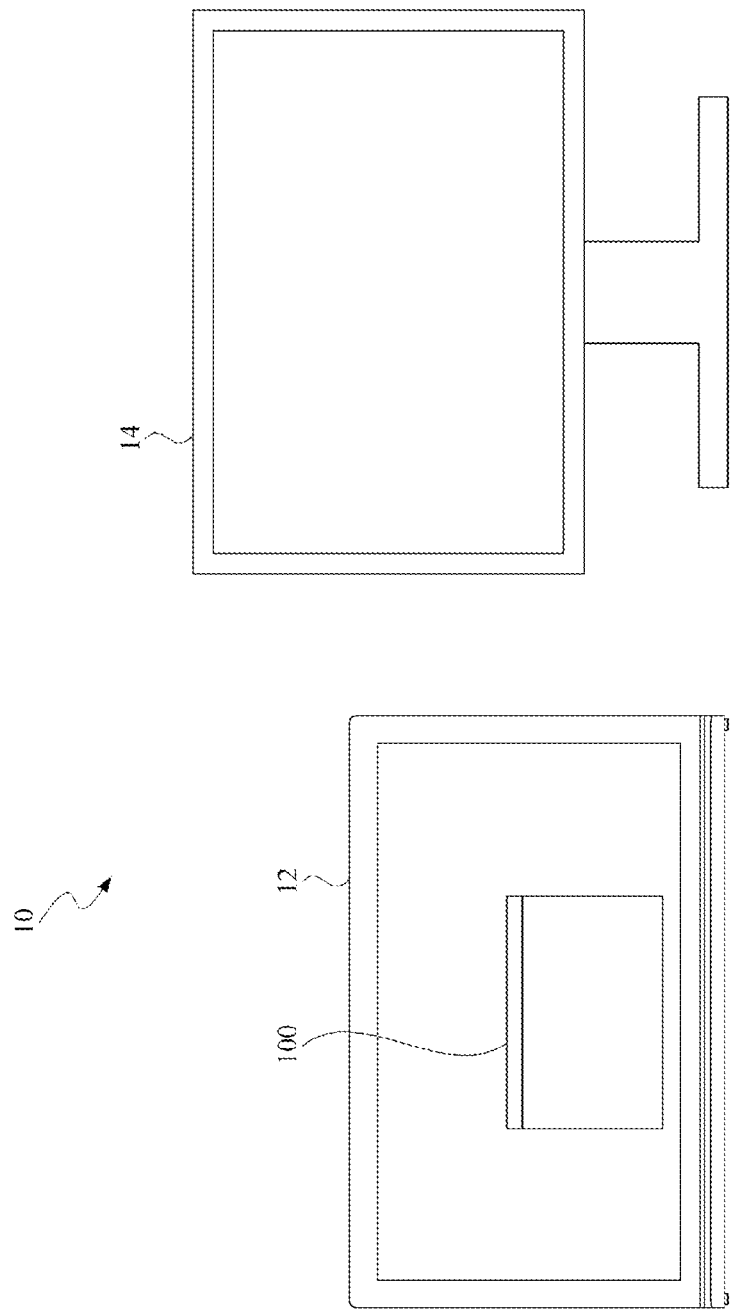
FIG. 3 to FIG. 9 show the execution results corresponding to the steps in FIG. 2.

FIG. 2 is a flowchart showing an embodiment of the displaying control method of this application. FIG. 3 to FIG. 9 show the execution results corresponding to the steps in FIG. 2.

The displaying control method includes the following steps. Firstly, refer to FIG. 1A, FIG. 1B, and FIG. 3 together. As described in step S120, a window 100 is displayed on the first display 12, and step S120 is executed by the processor 16. The processor 16 displays the window 100 on the first display 12 in response to a trigger event S0. In an embodiment, the trigger event is executing a specific application program.

Figure 4:
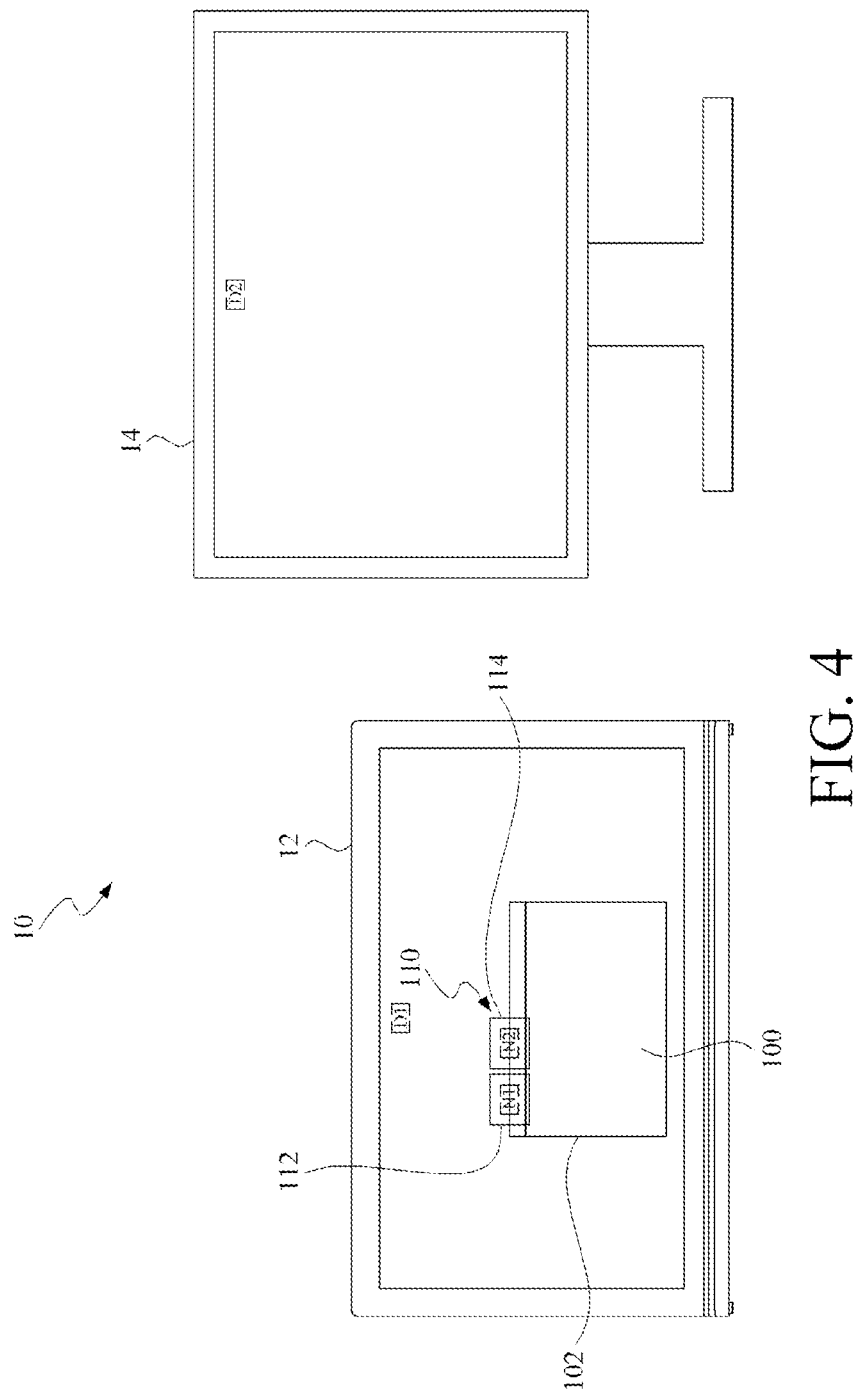

As described in step S130, and referring to FIG. 4 together, in response to a first trigger signal S1, a control interface 110 corresponding to the window 100 is generated on the first display 12. The control interface 110 includes a first operating area 112 and a second operating area 114, and the first operating area 112 and the second operating area 114 are corresponding to the first display 12 and the second display 14 respectively.

In an embodiment, step S130 is executed by the processor 16 and the input interface 18. The processor 16 receives the first trigger signal S1 through the input interface 18 and generates the control interface 110 corresponding to the window 100 on the first display 12 in response to the first trigger signal S1.

In an embodiment, the first trigger signal S1 is a position signal corresponding to an outer edge 102 of the window 100. That is, when the user moves a cursor to the outer edge 102 of the window 100, step S130 is triggered, and the control interface 110 corresponding to the window 100 is generated on the first display 12.

In an embodiment, the control interface 110 overlaps the window 100, that is, the control interface 110 is presented above the window 100 to facilitate the operations of the user.

In an embodiment, the control interface 110 is displayed at a fixed position on the first display 12 in the foreground mode without changing its position when the position of the window 100 changes, or is displayed beside the window 100 in the foreground mode without overlapping the window 100.

In an embodiment, the control interface 110 is a semi-transparent interface, so that the window 100 under the control interface 110 is also visible when the control interface 110 is presented.

In an embodiment, as shown in FIG. 4, in order to make the user easier to determine a correspondence between each operating area (the first operating area 112 and the second operating area 114 in this embodiment) and display (the first display 12 and the second display 14 in this embodiment), the control interface 110 includes a plurality of display numbers D1 and D2, which are respectively displayed on the first display 12 and the second display 14.

The first operating area 112 and the second operating area 114 of the control interface 110 have an operating area number N1 and N2 respectively, and the operating area numbers N1 and N2 correspond to the display numbers D1 and D2. That is, the user determines the displays corresponding to the operating areas according to the operating area numbers N1 and N2 on the operating areas. In an embodiment, in case that the operating area number N1 is the same as the display number D1, and the operating area number N2 is the same as the display number D2, as shown in FIG. 4, the first operating area 112 with the operating area number N1 corresponds to the first display 12 with the display number D1, and the second operating area 114 with the operating area number N2 corresponds to the second display 14 with the display number D2.

Generally speaking, hardware such as the displays connected to a computer system is detected and numbered after the computer system is started. In an embodiment, the display numbers D1 and D2 and the operating area numbers N1 and N2 are directly extracted from numbers assigned to the first display 12 and the second display 14 by the an operating system. Alternatively, the display numbers D1 and D2 and the operating area numbers N1 and N2 displayed on the control interface 110 are different from the numbers assigned by the operating system and are set by the user.

Figure 5:
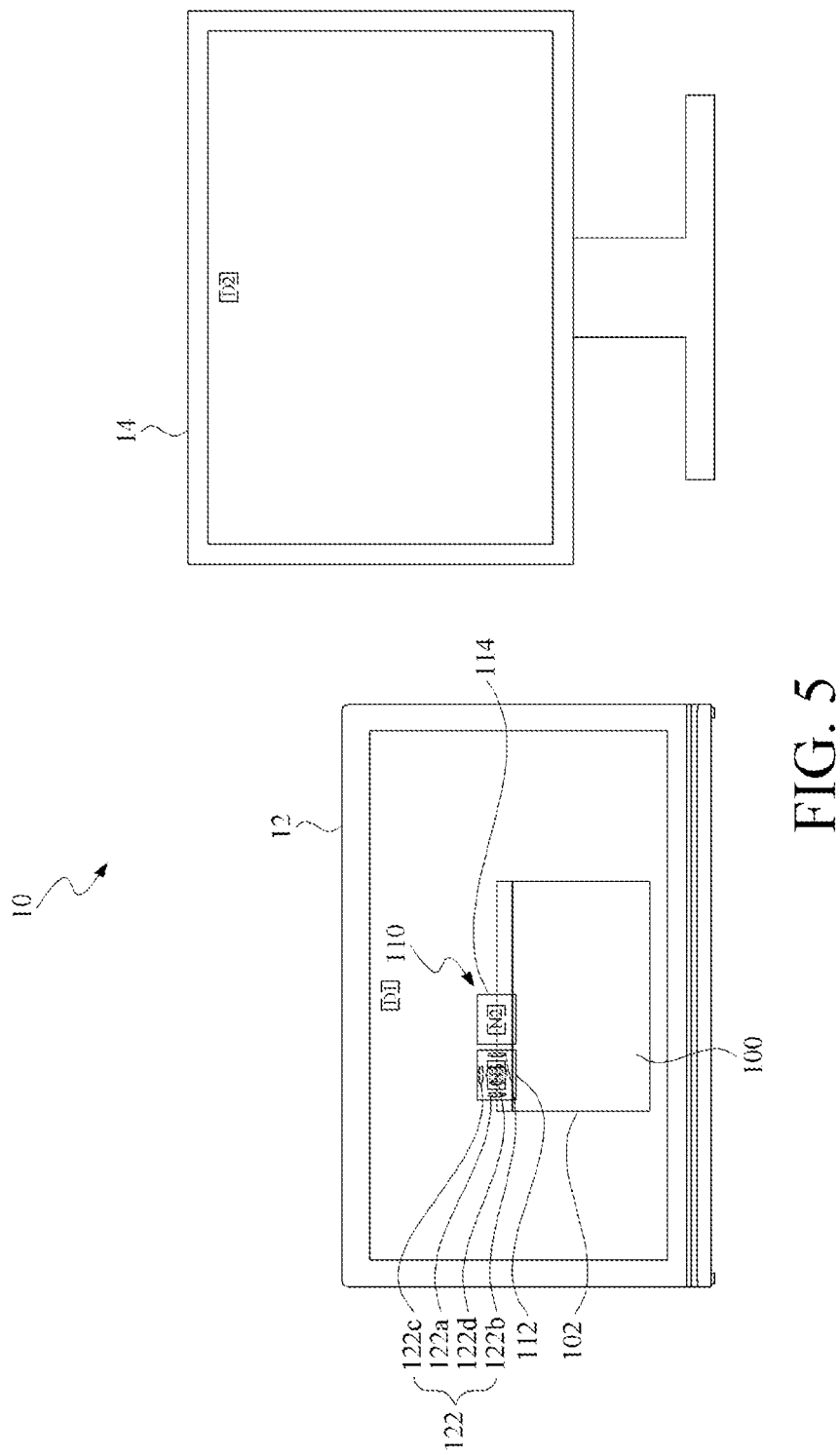

Then, as described in step S140, and referring to FIG. 5 together, in response to a second trigger signal S2, a plurality of actuating regions 122 is presented in the first operating area 112 or the second operating area 114.

In an embodiment, step S140 is executed by the processor 16 and the input interface 18. The processor 16 receives the second trigger signal S2 through the input interface 18 and presents the actuating regions 122 in the first operating area 112 or the second operating area 114 in response to the second trigger signal S2.

In an embodiment, as shown in FIG. 5, the actuating regions 122 correspond to relative positions on a display area of the first display 12 or the second display 14, and include a left actuating region 122a, a right actuating region 122b, a middle actuating region 122c, and an upper actuating region 122d.

The second trigger signal S2 is a position signal corresponding to the first operating area 112 or the second operating area 114. When the user moves the cursor to the first operating area 112, the plurality of actuating regions 122 is displayed in the first operating area 112 for the user to select, and when the user moves the cursor to the second operating area 114, the plurality of actuating regions 122 is displayed in the second operating area 114 for the user to select.

Figure 6:
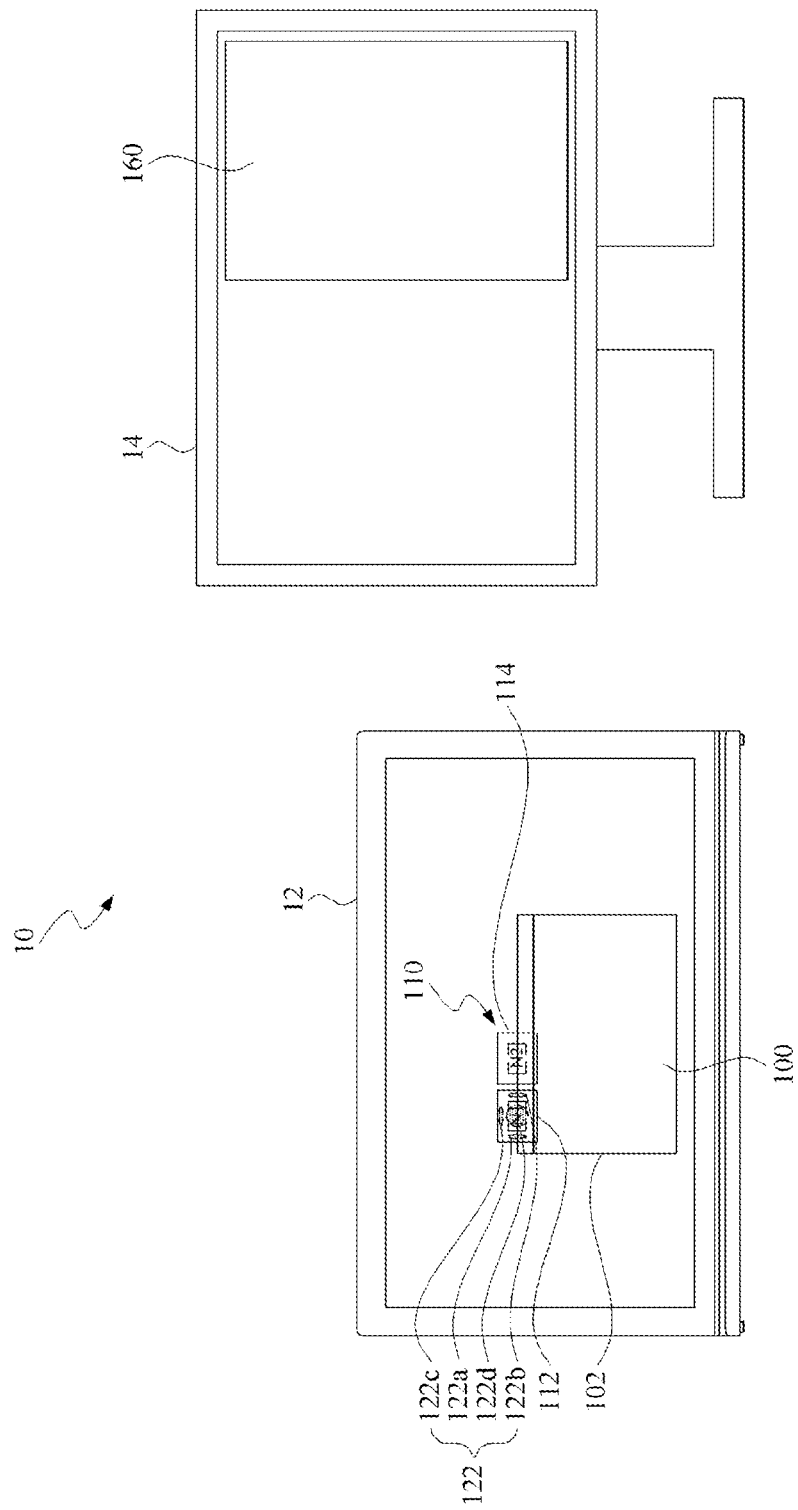

Then, as described in step S150, and referring to FIG. 6 together, in response to a third trigger signal S3 corresponding to one of the plurality of actuating regions 122, a corresponding target-indicating box 160 is displayed on the first display 12 or the second display 14.

The target-indicating box 160 displays a window position corresponding to each actuating region 122 so that the user confirms the displaying control effect after clicking each actuating region 122. The third trigger signal S3 is a position signal corresponding to one of the actuating regions 122.

In an embodiment, referring to FIG. 1A and FIG. 1B together, step S150 is executed by the processor 16 and the input interface 18. The processor 16 receives the third trigger signal S3 through the input interface 18 and presents the corresponding target-indicating box 160 in response to the third trigger signal S3.

Thereafter, as described in step S160, in response to a selecting signal S4 corresponding to one of the actuating regions 122, the window 100 is moved within a range of the first display 12 and the second display 14. When the user clicks the actuating region 122 in the first operating area 112, the window 100 moves within the range of the first display 12. When the user clicks the actuating region 122 in the second operating area 114, the window 100 moves within the range of the second display 14.

In an embodiment, referring to FIG. 1A and FIG. 1B together, step S160 is executed by the processor 16 and the input interface 18. The processor 16 receives the selecting signal S4 through the input interface 18 and moves the window 100 within the range of the first display 12 and the second display 14 in response to the selecting signal S4.

The displaying control effects generated in response to different selecting signals S4 are illustrated below with examples.

Figure 7:
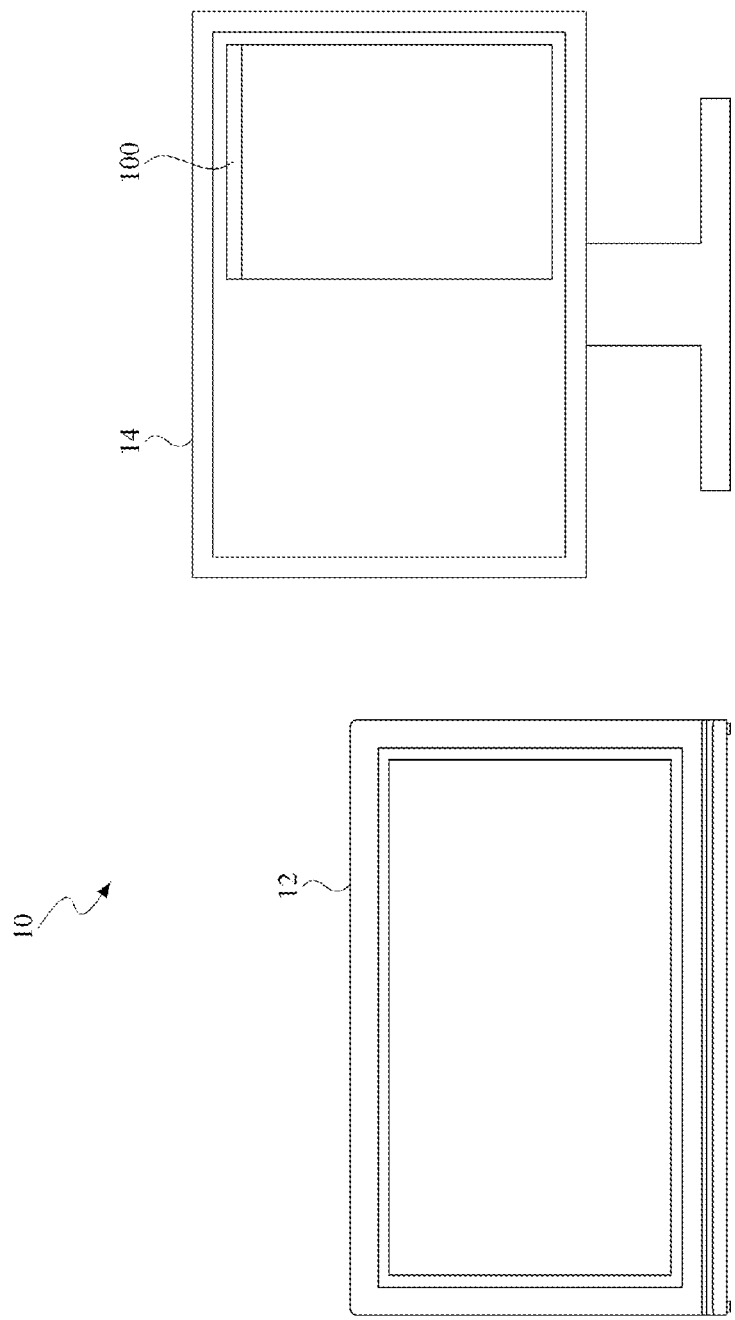

In an embodiment, when the selecting signal S4 is corresponding to the right actuating region 122b of the second operating area 114, the window 100 is moved to the right half of the second display 14. Similarly, when the selecting signal S4 is corresponding to the left actuating region 122a of the second operating area 114, the window 100 is moved to the left half of the second display 14, as shown in FIG. 7.

Figure 8:
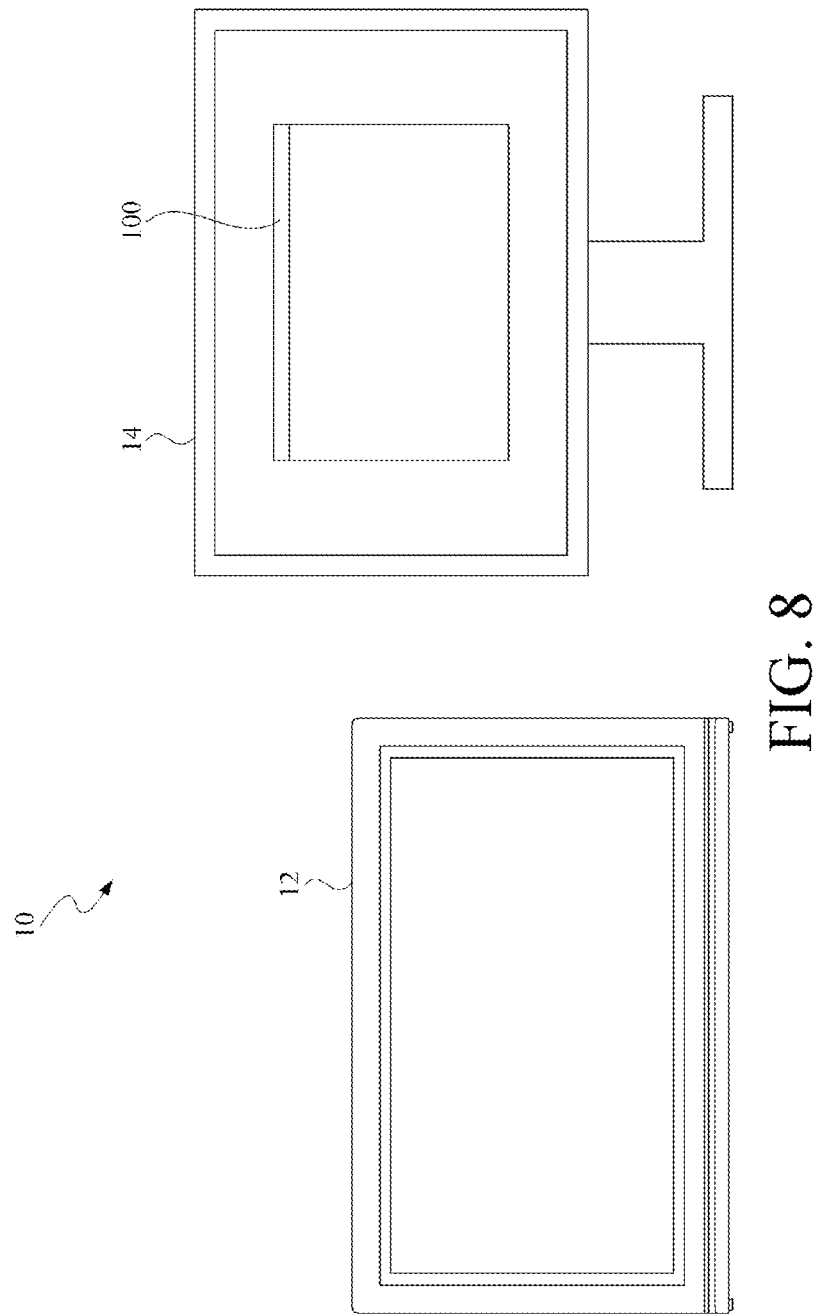

In an embodiment, when the selecting signal S4 is corresponding to the middle actuating region 122c of the second operating area 114, the window 100 is moved to the middle of the second display 14, as shown in FIG. 8.

Figure 9:
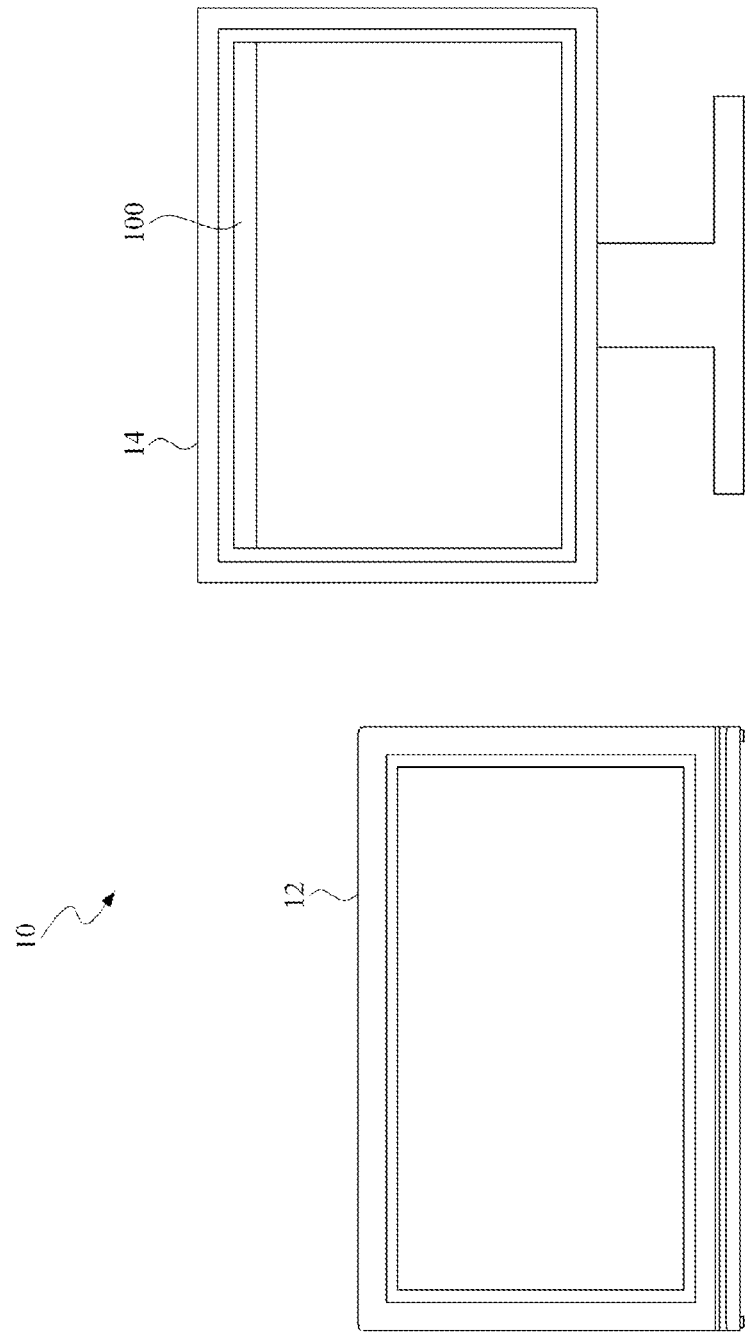

In an embodiment, when the selecting signal S4 is corresponding to the upper actuating region 122d of the second operating area 114, the window 100 is moved to the second display 14 and is opened and maximized, as shown in FIG. 9.

The aforementioned displaying control method describes an embodiment of a dual display. The displaying control method in this application is adapted to an electronic device with more displays. In an embodiment, in case that the displaying control method of this application is applied to an electronic device with three displays, the control interface 110 presented in response to the first trigger signal in step S130 displays three operating areas according to the display numbers, a plurality of actuating regions 122 is presented in the three operating areas in response to the third trigger signal in step S140, the target-indicating box 160 is presented on one of the three displays in response to the third trigger signal in step S150, and the window 100 is moved within the range of the three displays in response to the selecting signal in step S160.

Through the aforementioned displaying control method, the user selects the position to place the window 100 by using the control interface 110 overlapping the window 100 after opening the window 100. In this way, the window 100 is quickly moved among multiple displays and placed at a specific position without manually dragging the window 100 among multiple displays.

Next, various settings of the displaying control method of this application, such as the display numbers D1 and D2 and the operating area numbers N1 and N2 presented in step S130, the actuating regions 122 presented in step S140 and the corresponding displaying control effects, and the like, are set by the user. Specifically, in the displaying control method, a setting interface is generated on the first display 12 in response to an input signal for the user to perform the setting. The input signal is different from the first trigger signal S1, the second trigger signal S2, the third trigger signal S3, and the selecting signal S4 to avoid misjudgment. In an embodiment, the input signal corresponds to a specific icon on the first display 12 or to a specific function key on the keyboard.

Each step of the displaying control method of this application is implemented by hardware, software, firmware, or a combination thereof. When this application is implemented by a computer program product, the functions of each step of the displaying control method of this application are stored in a computer readable medium as one or more instructions, which are executed by the processor to implement the steps described in the displaying control method of this application. In an embodiment, the computer readable medium includes RAM, ROM, EEPROM, CD-ROM or other optical disk storage, magnetic disk storage or other magnetic storage devices, or is any other media used to store desired program code in the form of instructions or data structures and accessible by the computer.

Through the displaying control method provided in this application, the user uses the control interface to quickly move the window between multiple displays and place the window at a specific position without manually dragging the window after the window is displayed on the display. Therefore, it helps improve the work efficiency of the user.

The above are only preferred embodiments of this application. Any form of equivalent replacements or modifications to the technical means and technical content disclosed in this application by persons skilled in the art without departing from the technical means of this application shall be within the scope of protection of this application.

What is claimed is:

1. A displaying control method, adapted to an electronic device, wherein the electronic device comprises a first display and a second display, the displaying control method comprising:
    displaying a window on the first display;
    generating a control interface corresponding to the window on the first display in response to a first trigger signal, wherein the control interface comprises a first operating area and a second operating area, and the first operating area and the second operating area are corresponding to the first display and the second display respectively;
    generating a plurality of actuating regions in the first operating area or the second operating area in response to a second trigger signal; and
    moving the window within a range of the first display and the second display in response to a selecting signal corresponding to one of the actuating regions.

2. The displaying control method according to claim 1, wherein the actuating regions correspond to relative positions on a display area of the first display or the second display, and the actuating regions comprise a left actuating region, a right actuating region, a middle actuating region, and an upper actuating region.

3. The displaying control method according to claim 2, wherein when the selecting signal corresponds to the left actuating region of the second operating area, the window is moved to a left half of the second display, and when the selecting signal corresponds to the right actuating region of the second operating area, the window is moved to a right half of the second display.

4. The displaying control method according to claim 2, wherein when the selecting signal corresponds to the middle actuating region of the second operating area, the window is moved to the middle of the second display.

5. The displaying control method according to claim 2, wherein when the selecting signal corresponds to the upper actuating region of the second operating area, the window is moved to the second display and maximized.

6. The displaying control method according to claim 1, wherein the first trigger signal is a position signal corresponding to an outer edge of the window.

7. The displaying control method according to claim 1, wherein the second trigger signal is a position signal corresponding to the first operating area or the second operating area.

8. The displaying control method according to claim 1, wherein the control interface comprises a plurality of display numbers presented on the first display and the second display.

9. The displaying control method according to claim 8, wherein the first operating area and the second operating area each has an operating area number, and the operating area number corresponds to the display number.

10. The displaying control method according to claim 1, further comprising presenting a corresponding target-indicating box on the first display or the second display in response to a third trigger signal corresponding to one of the actuating regions.

11. The displaying control method according to claim 10, wherein the third trigger signal is a position signal corresponding to one of the actuating regions.

* * * * *